Aug. 28, 1945.    F. W. DE JAHN    2,383,715
PRODUCTION OF GAS MIXTURES FOR METHANOL
Filed April 17, 1943
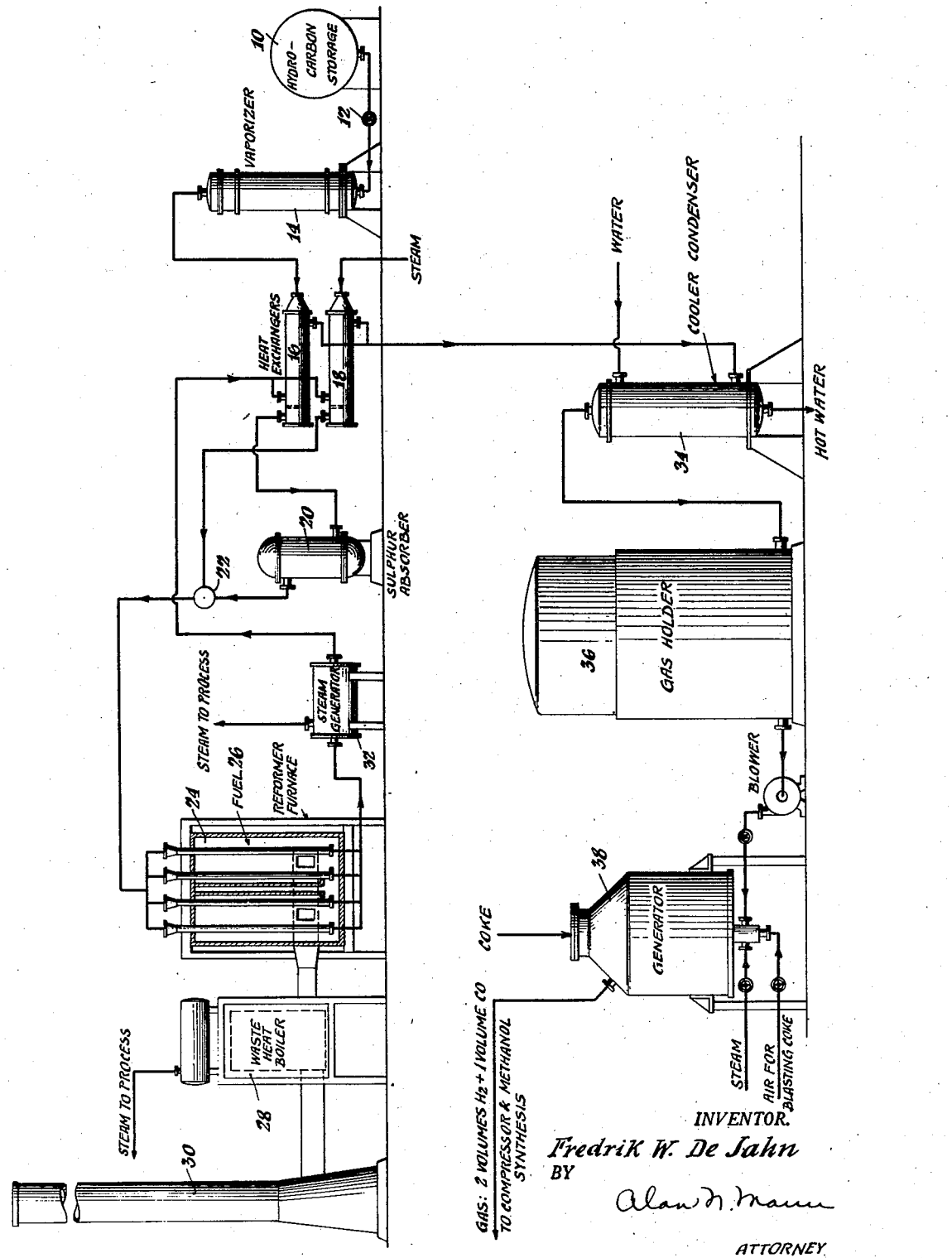
INVENTOR.
Fredrik W. De Jahn
BY
Alan N. Mann
ATTORNEY Patented Aug. 28, 1945

2,383,715

UNITED STATES PATENT OFFICE 2,383,715

PRODUCTION OF GAS MIXTURE FOR METHANOL

Fredrik W. de Jahn, New York, N. Y.

Application April 17, 1943, Serial No. 483,534

3 Claims. (Cl. 252—373)

Methanol is produced by passing a gas mixture comprising 1 volume of carbon monoxide and 2 volumes of hydrogen (there may be a slight excess of hydrogen) over a proper catalyst at high pressure at an elevated temperature. Ordinarily this gas mixture is made by preparing hydrogen in any known manner and mixing it in the desired proportion with carbon monoxide which is usually obtained from water gas.

I have discovered that this gas mixture can be made directly at relatively low cost by decomposing a proper hydrocarbon mixture with steam and finally adjusting the mixture by passing it through a bed of incandescent carbon.

The hydrocarbon mixture should contain these elements in the proportion of not more than 3 molecules of carbon for each 8 molecules of hydrogen and the proportion of carbon may be even lower. When the vapors of such a hydrocarbon are treated with steam in the presence of a catalyst we may consider the reaction as producing carbon monoxide and no carbon dioxide. In such case it is apparent that if one starts with 3 molecules of carbon and 8 molecules of hydrogen this will need 3 molecules of water to convert the carbon to carbon monoxide, and 6 additional molecules of hydrogen will be produced, so that the resulting gas mixture would contain 3 molecules of carbon monoxide and 14 molecules of hydrogen (that is, 7 volumes of $H_2$). This is a deficiency of carbon and it is an essential feature of my process that the initial gas mixture should have such a carbon deficiency so that the final adjustment can be made by passing the gas mixture through a bed of incandescent carbon (coke or anthracite coal) which will add carbon to the mixture in desired proportion.

Superficially it might appear that much higher homologs in the paraffin series could be employed, but it is to be borne in mind that in fact the initial reaction produces approximately one-half as much $CO_2$ as $CO$ and when this is converted to $CO$ as is hereafter described, additional carbon is introduced into the mixture. Accordingly, I have found that the average of the hydrocarbon used should not be materially higher in the paraffin series than propane. Some small amounts of higher material can be present but if present in any substantial proportion they should be counterbalanced by ethane or methane. The lower homologs may be used when the situation renders their use economical.

A particularly advantageous starting material for my process is propane which now can be obtained in liquefied form in the open market at a reasonable price.

If propane is decomposed with steam according to known processes (usually in the presence of a catalyst) a gas mixture is produced approximately in accordance with the following formula:

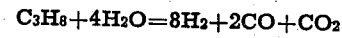
$$C_3H_8+4H_2O=8H_2+2CO+CO_2$$

The exact proportion of carbon monoxide and carbon dioxide will depend upon the temperature employed because this reaction is always carried out in the presence of a large excess of steam.

According to usual processes such a gas mixture as this is then treated in a second contact unit with additional quantities of steam, and the $CO$ is converted to $CO_2$ with the liberation of additional hydrogen. The $CO_2$ is then separated from the hydrogen by absorption. In accordance with my process the gas mixture containing hydrogen, carbon monoxide and carbon dioxide is cooled to remove excess moisture and then is passed through a bed of coke heated to incandescence. In this step the $CO_2$ is reduced to $CO$ so that we have the theoretical reaction as follows:

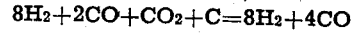
$$8H_2+2CO+CO_2+C=8H_2+4CO$$

This is the desired mixture for making methanol. However, in the course of production there are various gas losses and the conversion of $CO_2$ to $CO$ is not absolute so that it may be necessary to make some adjustments in the final gas mixture. By employing this treatment of the gas mixture in a bed of coke as a final step such adjustment can very readily be made. If additional carbon monoxide is needed to give the desired gas ratio all that is necessary is to pass a little extra steam into the coke bed and produce carbon monoxide and hydrogen in approximately equal volumes so that this step tends to lower the excess of hydrogen.

The computation necessary for determining the amount of steam to have present at this stage is a very simple one. One mol of $CO_2$ is computed as equivalent to 2 mols of $CO$ and on this basis the proportion of $CO$ that will be found in the ultimate gas mixture is approximately determined. For any deficiency of $CO$, a volume of steam must be present in the gas such that there will be approximately 2 mols of $H_2O$ present for each one mol of $CO$ that is computed as deficient. Suppose, for example, that an analysis shows that the gas contains 18 volumes of $H_2$, 4 volumes of $CO$ and 2 volumes of $CO_2$. It is obvious that if this mixture is reacted with carbon, the ultimate gas mixture would contain 18 volumes of $H_2$ and 8 volumes of CO, a deficiency of one volume of CO. If 2 mols of $H_2O$ are added to the gas mixture for each mol of CO that is thus computed as deficient, we will have the final reaction taking place approximately as follows:

$$18H_2+4CO+2CO_2+2H_2O+4C \rightarrow 20H_2+10CO$$

In other words, prior to the time that the gas mixture is passed through the incandescent coke, the water content of the gases should be adjusted to have approximately 2 mols of $H_2O$ present for each mol of CO needed to give the desired proportion of $H_2$ and CO after conversion of $CO_2$ to CO by reaction with carbon. Theoretically this could be done by removing exactly the right amount of steam, but since the amount of steam present will vary from time to time, adjustment in this manner is, as a practical matter so difficult as to be virtually impossible. A simple way to take care of the adjustment is to analyze the gases leaving the generator 38 and empirically to adjust the amount of steam added back to the gas mixture before it goes into this generator until the gases coming out have the desired proportions of hydrogen and carbon monoxide. This empirical adjustment will lead to the addition of the theoretical amount of steam and will further take into account any variations in the theoretical due to the particular equipment or to the fact that some of the steam may pass through the coke without reacting.

It is because of the fact that it is easy in this step to lower any excess of hydrogen that I want to be sure that I select a hydrocarbon for my initial treatment which will give an excess of hydrogen rather than an excess of carbon monoxide.

This process can readily be understood by reference to the accompanying drawing which illustrates the process diagrammatically.

The numeral 10 represents a tank for the storage of the hydrocarbon employed which for the purposes of illustration we can consider as being propane ($C_3H_8$). This hydrocarbon passes through an expansion valve 12 into a vaporizer 14 which may be heated in any desired manner. The hydrocarbon vapor, still under sufficient pressure to force it through the apparatus, passes through a heat exchanger 16 where it is further heated by heat picked up from the emerging gases. At the same time steam is passed into a parallel heat exchanger 18 where it is superheated by another portion of these gases. The vapors from heat exchanger 16 then may pass through an apparatus indicated at 20 for the removal of any sulphur compounds such as $H_2S$. The hydrocarbon and the steam from the heat exchanger 18 are led into a mixing chamber 22 in the proportion to have approximately 10 mols of $H_2O$ present for each mol of $C_3H_8$. This is about two and one-half times the theoretical amount of $H_2O$ needed for the reaction.

The gas mixture then goes through a reformer furnace indicated at 24 which is shown as being made up of tubes containing a catalyst which, for example, comprises nickel oxide. These catalysts are well known in the art. These tubes are heated externally by combustion gases indicated by the arrow 26. These tubes preferably are made of stainless steel to resist corrosion and oxidation at high temperature as the temperature usually employed in the reformer furnace is from about 800° C. to 900° C. The waste heat from the reformer furnace may be recovered in a waste heat boiler 28 to produce steam used elsewhere in the process. The products of combustion finally pass to a stack 30.

In the reformer furnace the propane vapor is converted to a mixture of hydrogen, carbon monoxide and carbon dioxide (with a residue of excess steam) approximately according to reaction:

$$C_3H_8+4H_2O=8H_2+2CO+CO_2$$

This gas mixture may then pass through a steam generator 32 to recover some of its sensible heat and to produce further steam for use in the process. The gas mixture then passes back to the heat exchangers 16 and 18 whose function has already been described and from these passes to a cooler condenser 34 where the excess steam is condensed. This preferably is a surface condenser.

The gas, now substantially freed from excess water vapor, passes to a gas holder 36 where the gas mixture may be analyzed as required to ascertain its composition. From the gas holder the gas mixture is passed periodically through a generator, similar to the generators used in the production of water gas, where it passes through a bed of incandescent coke. This coke converts the $CO_2$ to CO and gives the final gas mixture as has already been brought out above.

It will also be found that if any residual traces of lower hydrocarbons such as methane remain in the gas mixture as it comes from the gas holder these will be entirely decomposed in the generator 38 and converted to carbon monoxide and hydrogen.

For the purpose of flushing out the generator some steam will have to be used as of course air is employed to bring the coke back to incandescence after it has been cooled by reducing the gases. There may be a small deficiency of carbon and if so it can be made up by the formation of some blue water gas in the generator, which takes care of the steam used for flushing. If this is found necessary there is ample margin in the process to permit of this being done.

From the foregoing it will be seen that the use of the generator 38 not only serves to eliminate the carbon dioxide from the gas mixture, which is an expensive process in the production of hydrogen from water gas, but also serves as a general control medium for bringing the gas mixture to the desired composition. In the manufacture of methanol only from about 8 to 10% of the volume of the gas is converted in a single pass through the catalyst. The methanol is then condensed and the unconverted gas is returned to the catalyst with additional new gas. If the gas mixture is not correct any divergence from the theoretical will become cumulative. By having a control mechanism which permits the proportions of hydrogen and carbon monoxide to be adjusted, an analysis of the gas in the methanol equipment can be made from time to time and my process can be adjusted in order to keep the gas mixture in the methanol equipment in the correct ratio without the necessity of maintaining reserve stocks of the separate gases.

As a result I find that my process can be operated very cheaply and efficiently and the cost of equipment is very low compared with the usual costs of producing hydrogen and carbon monoxide separately. The device also lends itself to the operation of units of relatively small capacity.

What I claim is:

1. A process of producing a mixture of approximately one volume of carbon monoxide with two volumes of hydrogen in a form adapted for use in making synthetic methanol which comprises decomposing a hydrocarbon not having substantially more than three molecules of carbon for each 8 molecules of hydrogen with an excess of steam under conditions adapted to produce a substantial proportion of $CO_2$, whereby there is produced a gas mixture comprising hydrogen, carbon monoxide, carbon dioxide and residual steam and then after removing residual steam passing such gas mixture through a bed of incandescent carbon to convert $CO_2$ to CO while adding steam to the gas mixture passed through the incandescent carbon, in order to adjust the amount of CO in the residual gas mixture to the desired proportions.

2. A process of producing a mixture of approximately one volume of carbon monoxide with two volumes of hydrogen in a form adapted for use in making synthetic methanol which comprises decomposing a hydrocarbon not having substantially more than three molecules of carbon for each 8 molecules of hydrogen with an excess of steam under conditions adapted to produce a substantial proportion of $CO_2$, whereby there is produced a gas mixture comprising hydrogen, carbon monoxide, carbon dioxide and residual steam, and then after removing residual steam adjusting the water content of the gases by adding back controlled amounts of steam so as to have present approximately 2 volumes of steam for each volume of CO needed to give the desired proportions of $H_2$ and CO after conversion of $CO_2$ to CO by reaction with carbon, and passing such gas mixture through a bed of incandescent carbon.

3. A process as specified in claim 2 in which the hydrocarbon employed is liquefied propane.

FREDRIK W. DE JAHN.